(12) United States Patent
Hoffmann et al.

(10) Patent No.: US 9,448,423 B2
(45) Date of Patent: Sep. 20, 2016

(54) DEVICE AND METHOD FOR SELECTING OPTICAL PULSES

(71) Applicant: Forschungsverbund Berlin E.V., Berlin (DE)

(72) Inventors: Thomas Hoffmann, Berlin (DE); Armin Liero, Berlin (DE); Andreas Klehr, Berlin (DE); Sven Schwertfeger, Berlin (DE)

(73) Assignee: Forschungsverbund Berlin E.V., Berlin (DE)

( * ) Notice: Subject to any disclaimer, the term of this patent is extended or adjusted under 35 U.S.C. 154(b) by 691 days.

(21) Appl. No.: 13/910,142

(22) Filed: Jun. 5, 2013

(65) Prior Publication Data

US 2013/0322806 A1     Dec. 5, 2013

(30) Foreign Application Priority Data

Jun. 5, 2012   (DE) .......................... 10 2012 209 485

(51) Int. Cl.
*G02F 1/025*   (2006.01)
*G02F 1/01*    (2006.01)

(52) U.S. Cl.
CPC ............. *G02F 1/025* (2013.01); *G02F 1/0121* (2013.01); *G02F 2201/16* (2013.01)

(58) Field of Classification Search
CPC ............. G02F 1/025; G02F 1/03; G02F 1/07
See application file for complete search history.

(56) References Cited

U.S. PATENT DOCUMENTS

| 5,798,856 | A   | 8/1998  | Suzuki et al. |
| 2003/0180054 | A1  | 9/2003 | Watanabe et al. |
| 2011/0261439 | A1* | 10/2011 | Klehr ...................... G02F 1/025 359/341.1 |

FOREIGN PATENT DOCUMENTS

DE      102008056096      5/2010

* cited by examiner

*Primary Examiner* — Tina Wong

(57) ABSTRACT

The invention discloses a device for selecting pulses comprising an optical waveguide for guiding the optical radiation along an axis; comprising a first electro-optical modulator designed to modulate the optical transparency of the waveguide; comprising a second electro-optical modulator designed to modulate the optical transparency of the waveguide, wherein the first modulator and the second modulator are arranged one after the other on the axis of the waveguide, and further comprising at least one control circuit designed to actuate the first modulator and the second modulator at offset times, and characterized in that a substrate of a semiconductive material is provided, the waveguide and the at least one control circuit are arranged on the substrate.

3 Claims, 5 Drawing Sheets

300 301

DEVICE AND METHOD FOR SELECTING OPTICAL PULSES

RELATED APPLICATION

This application claims the benefit of priority of German Patent Application No. 10 2012 209 485.7 filed Jun. 5, 2012, the contents of which are incorporated herein by reference in their entirety.

FIELD AND BACKGROUND OF THE INVENTION

This invention relates to a device and method for selecting optical pulses.

A multitude of applications, e.g. certain fields of laser machining, photo and display technology, biomedical screening techniques based on fluorescence spectroscopy, laser range finding, LIDAR, and optical analytics require the provision of very short optical pulses (down to the femtosecond range) at a low repetition rate (up to 100 MHz) Since conventional short-pulse laser systems, such as mode-coupled lasers, generate pulses at a high repetition rate, fast optical modulators (pulse pickers) are needed that can select and transmit individual pulses from the fast pulse trains, that is, achieve a frequency division. These singled out pulses could then be separately processed. Unlike mode-coupled laser systems, systems with a modulator provide the option to generate pulses of almost any shape, length, and repetition rate.

Pockels cells that work with non-linear voltage-dependent optical crystals are a known means of selecting pulses. Kerr cells with a field-dependent polarization are also known to be usable. It is a disadvantage that they require high voltages. The capacities for which charges have to be shifted accordingly are also very high. The minimum pulse width (and thus the maximum input pulse repetition rate) that can be achieved and the repetition rate of the switch (and thus the maximum output pulse repetition rate) are very limited. Pulse widths of several 10 ns (typically 30 ns) can be reached. The repetition rate is several MHz.

The use of acousto-optical modulators is also known for pulse selection. A standing ultrasonic field is generated by applying a RF voltage. This field then diverts the optical laser pulses. The generation of a standing field takes time. Pulses of at least several ns can be achieved in this way. The repetition rate is limited by the maximum mean output so that not much more than 10 MHz is reached.

Furthermore, the use of electro-optical modulators is also known for pulse selection. The simplest example of electro-optical modulators consists of a crystal, e.g. lithium niobate, in which the refractive index depends on the strength of the electrical field applied. Therefore the transparency of the crystal is a function of the applied field strength. Electro-optical crystals change their optical thickness instantaneously as a function of the strength of an applied electrical field. The effect depends on the polarization of the incident radiation. The optical path difference for two orthogonally polarized beams is 180°, when the so-called $\lambda/2$ radiation is applied. The polarization plane turns by 90° for incident linearly polarized light if the crystal is adjusted accordingly. A polarizer completely removes the light from the beam path. The intensity of the light passing through can be modulated by varying the voltage applied. The modulator can therefore be viewed as a phase retardation plate with electrically adjustable retardation. Optical pulses can therefore be selected by voltage variation.

Furthermore, the use of an integrated electro-optical modulator on waveguide basis is also known for pulse selection. The base element is a phase coupled Mach Zehnder amplitude modulator based on the ferroelectric crystal material, lithium niobate. Modulation is performed by electro-optical detuning of the waveguide interferometer due to an electric voltage applied to the electrode system.

The light modulators described have the disadvantage that they are relatively big and require much adjustment, and that the modulation frequency is not large enough for separating individual pulses.

U.S. Patent Publication No. 2005/0206989 A1 discloses a multi-bandgap modulator that can have a broader range of wavelengths due to separately addressable sections of different bandgaps, or can compensate chirp.

EP 1 065 765 A2 describes a laser with improved modulation across a wide range of wavelengths. The laser diode and the modulator are grown in one structure, i.e. onto a common substrate, and the modulator comprises at least a first and a second range in which modulation of the light of the laser diode is achieved by applying a reverse voltage.

U.S. Patent Publication No. 2003/0180054 A1 discloses an optical modulator for ultrafast pulses, wherein the driver circuit and modulator are integrated onto one substrate and the between the driver circuit and the optical modulator is smaller than one tenth of the wavelength of the modulation frequency. The maximum modulation frequency can be achieved by reducing the inductance of the electric lines between the driver circuit and the optical modulator.

However, it is a disadvantage of these modulators mentioned above that, depending on the intensity of the pulses in the pulse picker section—i.e. in the modulator—charge carriers can form that result in an undesirable transparency of the pulse picker section although no charge carriers are injected via the contacts. The optical modulator therefore has a relatively low breakdown resistance.

EP 1 210 754 B1 describes an electro-optical modulator with a large extinction ratio and an improved nonlinear extinction curve, wherein a semiconductor laser source, the electro-optical modulator, and a semiconductor amplifier are integrated onto one substrate. Therefore, this device cannot be used for modulating laser pulses generated externally because these cannot be coupled in. In addition, the device can only be used for modulating low outputs.

U.S. Pat. No. 5,798,856 discloses an optical laser pulse generator for glass fiber communication that reduces a wave packet broadening due to dispersion.

SUMMARY OF THE INVENTION

According to the invention, a device for selecting pulses is disclosed, comprising: an optical waveguide for guiding an optical radiation along an axis; a first electro-optical modulator designed to modulate the optical transparency of the waveguide; a second electro-optical waveguide designed to modulate the optical transparency of the waveguide, wherein the first modulator and the second modulator are arranged one after the other along the axis of the waveguide, wherein at least one control circuit is provided that is designed to actuate the first modulator and the second modulator at offset times.

It is preferred that the substrate consists of a semiconductive material and that the waveguide and the at least one control circuit are integrated onto the substrate.

The advantage lies in integrating the optical and electrical structures during production, which provides for smallest dimensions.

The substrate preferably is a semiconductor. The at least one control circuit, the first modulator and the second modulator are preferably monolithically integrated into the substrate. The substrate is preferably designed for monolithic integration of control circuit and modulator or of control circuits and modulators.

A distance, preferably referring to the respective centers of the respective sections, between the control circuit and the first and/or second modulator is preferably smaller than 10 mm, still preferably smaller than 5 mm, more preferably smaller than 2 mm, still preferably smaller than 1 mm, more preferably smaller than 500 µm, even more preferably smaller than 200 µm, and also preferably smaller than 100 µm.

The thickness of the substrate is preferably smaller than 2 mm, still preferably smaller than 1 mm, more preferably smaller than 500 µm, preferably smaller than 200 µm, and most preferably smaller than 100 µm.

The advantage of this invention is that each electro-optical modulator is optimized for fast switching of precisely one edge each (attack or release). Two optimized edges as a result of time-staggered actuation of different modulators are switched faster, according to the invention, than two edges (attack and release) as a result of a single electro-optical modulator. Thus the primary pulse rate can be increased but single pulses can still be properly suppressed, that is, a modulation at a broader spectral width can be performed.

The advantage of the invention is not primarily based on the wavelength of the light pulses or the width of an individual pulse but rather on the time elapsed between pulses, in a figurative sense also called repetition rate or pulse rate, and especially the improved gate width as a result of the shorter time that the time between the opening edge of the first modulator (if already in open position, transparency, of the second modulator) and closing edge of the second modulator (if still in open position, transparency, of the first modulator). The transition from open position (transparency) to closed position (absorption) as well as the opposite switching direction is preferably achieved by the electric control current at the respective electro-optical modulator. For example, the laser diode and the modulator are grown in one structure, i.e. onto a common substrate, and the modulator comprises at least a first and a second range in which modulation of the light of the laser diode is achieved by applying a reverse voltage.

According to the invention, ultrashort electric gate widths (e.g. in the picosecond range) can be achieved for the transparency circuit of semiconductor sections for optical pulse selection at repetition rates in the GHz range.

Since the transparency of the electro-optical modulators, also called sections, is produced by the electrical actuation pulses, time-staggered actuation of the sections at a small time difference can significantly reduce the transparency time and thus the passage time (gate width) for optical pulses fed into these sections. The transparency time for selecting laser pulses can be varied by controlled postponement of the delay between actuation current pulses. Individual short laser pulses (if desired, at a lower repetition rate) can be singled out from a sequence of high frequency laser pulses. These singled out pulses can then be processed separately.

Another advantage is that the actuation circuit can be optimized to one edge, and it is easier than equipping the circuit for a variable pulse width but to optimize it for just one pulse width. The actuation delay between the first and the second section determines the gate width. According to the invention, the increased performance of the envelope curve is therefore accompanied by simpler actuation circuitry.

Shaping electrical pulses for just one edge is an easier switching task than a high steepness for both edges.

It is preferred that the second edge of the first modulator is steeper than the first edge. This means that the gate must be faster to close than to open. Since such a closing process, in electrical terms, means the transition of the actuation voltage from a zero potential to a plus potential and should have as steep an edge as possible, it is preferred that the gate is directly connected to a transistor without an additional resistor, and that transistor pulls an active electrical pole of the gate to a plus potential during closing.

The rising edge of the first modulator is produced in that the transistor becomes high-resistance and the active electrical pole of the gate is pulled up to a plus potential by a resistor set to a plus potential.

The pull-up resistance is preferably greater than the resistance of the transistor switched in the forward direction to keep the voltage drop across the closed transistor as small as possible and to reduce power loss. Asymmetrical edge steepness results from the switching principle in which the pull-up resistance of the passive component acts against the pull-down resistance of the closed transistor.

It is preferred that the first edge of the second modulator is steeper than the second edge. This means that the gate must be faster to open than to close. Since such an opening process, in electrical terms, means the transition of the actuation voltage from a zero potential to a plus potential and should have as steep an edge as possible, it is preferred that the active pole of the gate is directly connected to a transistor switched in the forward direction while the gate opens, and that transistor pulls an active electrical pole of the gate at a low resistance to the plus potential.

The falling edge of the second modulator, however, is produced in that the transistor becomes high-resistance and the active electrical pole of the gate is pulled down to a zero potential by a resistor set to zero potential.

The pull-down resistance is preferably greater than the resistance of the transistor switched in the forward direction to keep the voltage drop across the closed transistor as small as possible; first, to reduce power loss and second, to turn on the active pole of the gate as best as possible. The asymmetrical edge steepness of the second electrical gate also results from the switching principle in which the pull-up resistance of the closed transistor acts against the pull-down resistance of the passive component.

It is also conceivable to implement the steep-edged closing and opening actuation using a symmetrical voltage supply and two transistors working in push-pull mode such that the active pole of the gate is pulled to the negative voltage supply by the inverting transistor in the open state (transparency) and to the positive voltage supply (plus potential) by the non-inverting transistor in the closed state (absorption). Thus no other resistors are required to passively pull into the opposite direction, only active low-resistance switches (transistors in push-pull mode) are needed, which can better overcome parasitic capacitances due to their low resistance and provide for steep edges in both directions. The outcome is that both a fast rising edge and a fast falling edge can be achieved with just one gate. This variant can be implemented with the constraint that the p-channel or PNP transistors have comparatively poorer switching properties than, for example, n-channel or NPN transistors. The switching variant using n-channel or NPN transistors is therefore preferred.

It is preferred that the optical waveguide comprises a first section for light feed-in and a second section for light extraction, wherein the first modulator and the second modulator are located between the first section for light feed-in and the second section for light extraction.

The advantage is that the device can be used as an additional element in a light path and be cascaded. This also allows the modulation of laser pulses that are generated externally. It is also possible that the first modulator and/or the second modulator are comprised of a semiconductor laser structure.

The semiconductor laser structure may also include a laser diode that can be produced cost-efficiently.

It is also possible that the first modulator and/or the second modulator are comprised of a ridge waveguide semiconductor laser structure. The ridge waveguide is used for waveguiding.

Its advantage is the compact design and that it can handle highest frequencies due to its small dimensions.

It is also possible that the device is designed as a monolithic integrated electro-optical component.

In other words, the optical waveguide, the electro-optical modulators and the electronic actuation of the electro-optical modulators can be integrated into a multilayer solid block. The layers may include metal, dielectric material, or semiconductive metal. The modulators and their actuation circuit or parts thereof and the waveguide are located in different sections of a monolithically designed substrate.

The advantage of this uniform manufacture is the reliability of contact and connection, especially with respect to stability and reliable operation.

It is also possible that another electro-optical amplifier is provided that is connected to the waveguide.

This electro-optical amplifier preferably includes an integrated semiconductor laser structure with electrical contacts. The amplifier is preferably provided behind the electro-optical gates (with respect to the direction of light propagation).

The advantage is that the available light output can be increased after modulation.

According to the invention, a method for selecting optical pulses with improved edge steepness is disclosed that comprises the following process steps: Input of a pulse sequence into the optical waveguide; controllable absorption of portions of the pulse sequence in the first electro-optical modulator; controllable absorption of portions of the modulated pulse sequence in the second electro-optical modulator, wherein the first modulator is switched to transparency while the second modulator is switched from absorption to transparency, and wherein the second modulator is switched to transparency while the first modulator is switched from transparency to absorption.

It is preferred that an edge with which the first modulator switches from transparency to absorption is steeper than the edge with which the second modulator switches from transparency to absorption; furthermore, an edge with which the second modulator switches from absorption to transparency is steeper than the edge with which the first modulator switches from absorption to transparency.

In the meaning of the above, the steepness of an edge preferably expresses the absolute amount of the first derivative of attenuation with respect to time, wherein attenuation is that property of the modulator that reduces the optical power output from the modulator versus the optical power input into the modulator. It is preferred that the maximum possible attenuation corresponds to the optical power that entered the modulator in the absorption state, and therefore the minimum possible attenuation corresponds to the difference of the optical power that entered the modulator in the state of transparency and the optical power output b the modulator in the state of transparency, said difference preferably equaling zero.

It is preferred that the rise of an edge is marked in that the optical power passed through the modulator within a freely determinable small time interval that is greater than zero changes by a freely determinable amount unequal to zero, wherein the rise of the edge corresponds to the beginning of the time interval.

It is preferred that the fall of an edge is marked in that the optical power passed through the modulator within a freely determinable small time interval that is greater than zero changes by a freely determinable amount unequal to zero, wherein the fall of the edge corresponds to the end of the time interval.

The advantage is improved edge steepness when the light channel closes and when it opens.

It is also possible that a periodic pulse sequence is fed into the waveguide, wherein the period duration of the pulse sequence is greater than the time interval between (preferably first) point in time at which the second modulator is switched from absorption to transparency and a (preferably second) point in time at which the first modulator is switched from transparency to absorption.

The advantage of periodicity is that energy is concentrated for a short period of time and thus the high peak intensity is generated at a moderate permanent load and moderate heat dissipation.

It is also conceivable that the period duration of the pulse sequence is smaller than the time interval between a (preferably first) point in time at which the first modulator is switched from absorption to transparency (first non-steep edge) and a (preferably second) point in time at which the second modulator is switched from transparency to absorption (first steep edge), wherein the second point in time follows after the first point in time.

The advantage is that shortest pulse sequences can be handled despite the moderate electrical switching rate.

BRIEF DESCRIPTION OF THE DRAWINGS

The invention is explained in greater detail with reference to the drawings and the description below.

In the drawings.

DESCRIPTION OF SPECIFIC EMBODIMENTS
OF THE INVENTION

Figure 1:
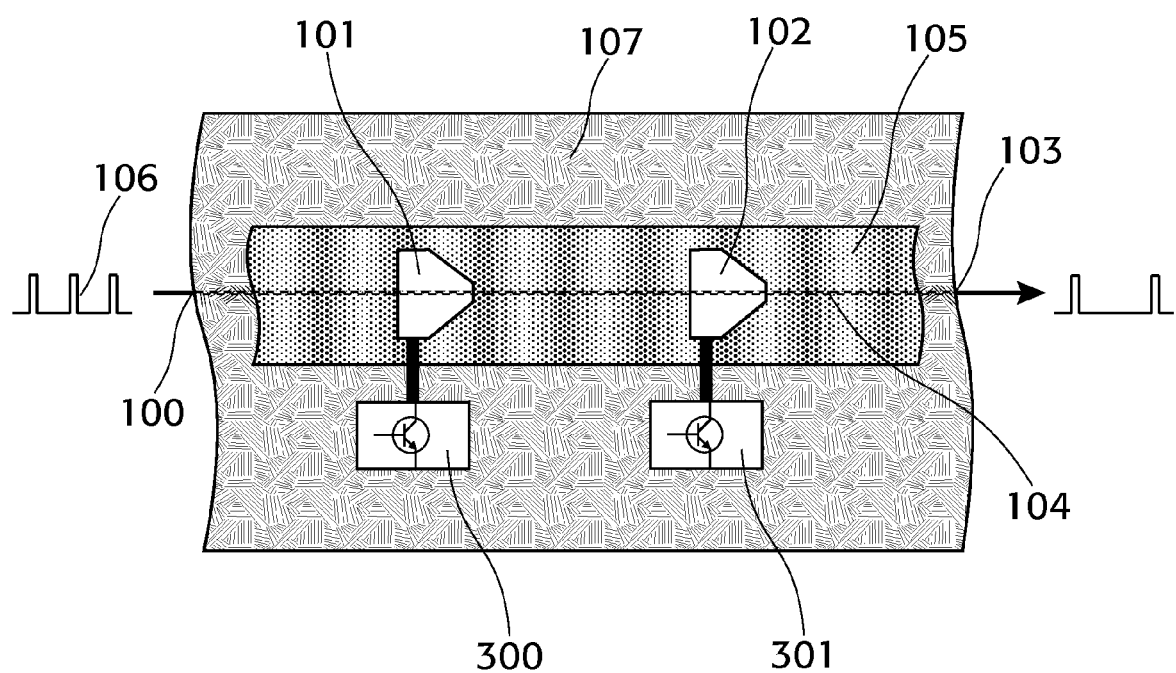
FIG. 1 shows a diagrammatic top view of a preferred embodiment of the device according to the invention.

FIG. 1 shows a preferred embodiment of the device according to the invention comprising an optical waveguide 105 (the axis 104 extends in the direction of light propagation), a first facet 100 for light input, a second facet 103 for light output, a first ridge waveguide modulator 101 and a second ridge waveguide modulator 102. The first waveguide section as the first electro-optical modulator 101 and the second waveguide section as the second electro-optical modulator 102 are integrated in the direction of light propagation 104 between the first facet 100 and the second facet 103.

The modulators 101 and 102 may also be called electro-optical gates or sections because they can close and open the light path. The pulses 106 at the first facet 100 represent the function of the pulse picker with respect to the pulses at the second facet 103, and that pulse picker suppresses the middle pulse (of the pulse sequence shown) to select just two out of three pulses.

Optical pulses 106 are input into the semiconductor component 107 with integrated waveguide 105, conducted through the two sections 101, 102 and either output or absorbed in each section depending on an electrically controlled transparency or absorption state of the respective section. It is a characteristic of the invention that the first driver circuit 300 and the second driver circuit 301 are designed to actuate the first modulator 101 and the second modulator 102 at offset times.

Figure 2:
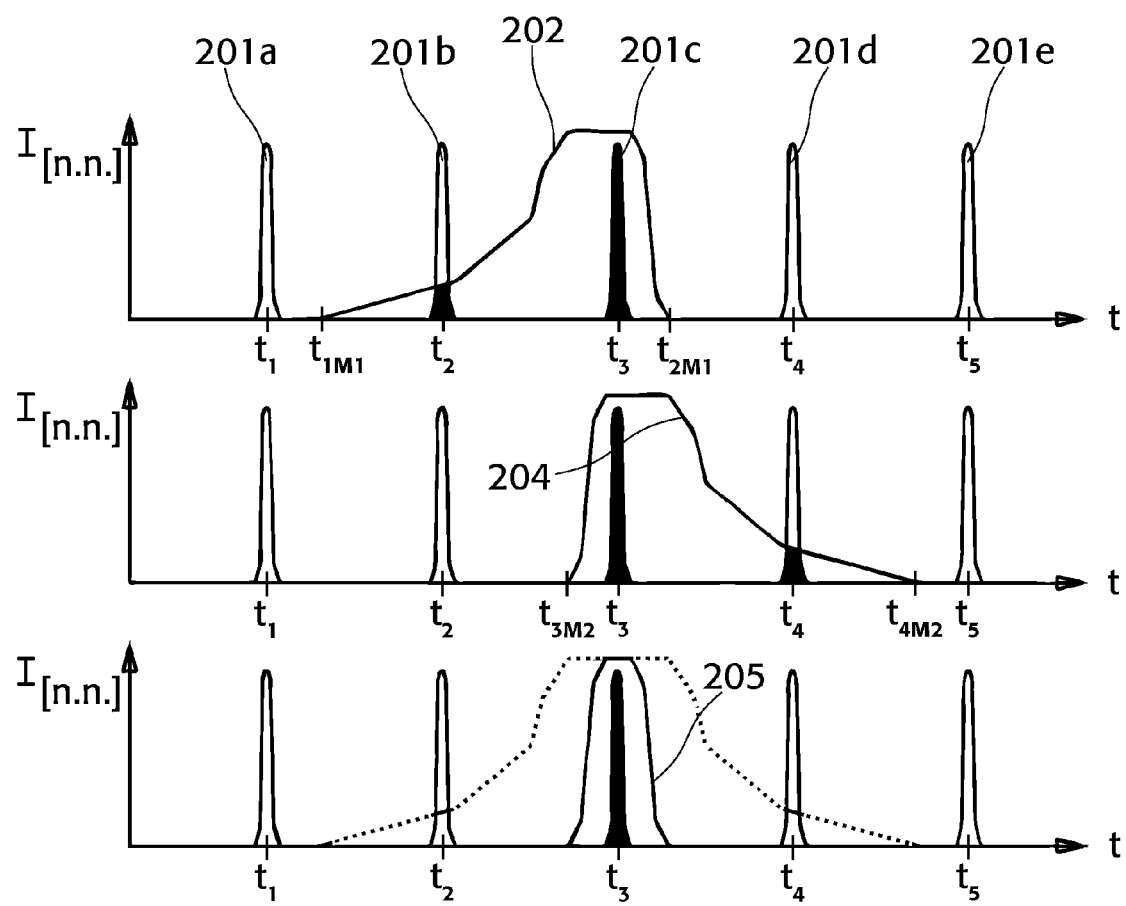
FIG. 2 shows the pulse regime before, between, and behind the two modulators according to the method of the invention.

FIG. 2 shows the intensity-time diagrams in the time period t, with individual input pulses 201a, 201b, 201c, 201d, 201e, also called pulse regime, and the resulting output pulse 201c.

The top diagram represents the envelope of the first modulator 101, outlined as envelope 202, which completely hides the first pulse 201a, the fourth pulse 201d, and the fifth pulse 201e and lets the second pulse 201b pass partially and the third pulse 201c pass completely (transparency). The schematic of the black filling level within a black pulse contour surrounding a white filled area indicates the level of non-attenuation of the respective pulse. In other words: If the pulse area is all black, this means that the pulse passes the light channel without obstruction, i.e. that the modulator is switched to its transparent state.

The time $t_{1M1}$ marks the beginning of the rising edge of the envelope 202 and can, for example, be defined as the point in time at which the intensity exceeds a specific threshold value.

The time $t_{2M1}$ marks the end of the falling edge of the envelope 202 and can, for example, be defined as the point in time at which the intensity drops below a specific threshold value.

The diagram in the middle shows the transparency function of the second modulator 102, outlined as envelope 204.

The bottom diagram shows the transparency function resulting from both modulators 101, 102, outlined as envelope 205. The envelope 205 is the result of the two edges optimized for steepness, so that the envelope 205 encompasses the pulse 201c that is filled all black and allowed to be passed as tightly as possible, while the dotted line indicates the temporal overlap of the two envelopes 202, 204 from which envelope 205 results.

Envelope 202 shows that the non-steep opening edge, switching from absorption to transparency, takes a longer attack time than the release time of the steep closing edge, switching from transparency to absorption.

If the time between two points generated by the time axis contacting the beginning and end of each envelope 202, 204, 205 is called the transparency phase, it becomes apparent that the transparency phase in the bottom diagram resulting from the envelope 205 is clearly shortened because the two sections 101 and 102 are actuated at different times.

Figure 3:
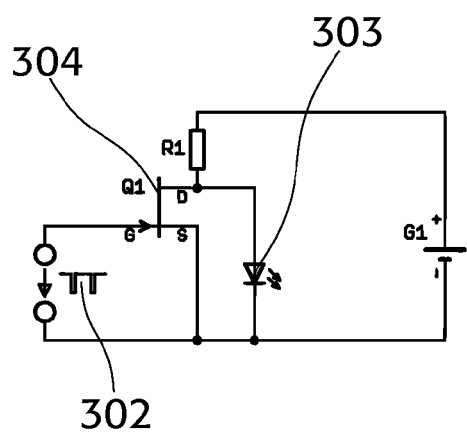
FIG. 3 shows a diagrammatic view of a first preferred embodiment of the actuation circuits for the modulators.
Figure 3:
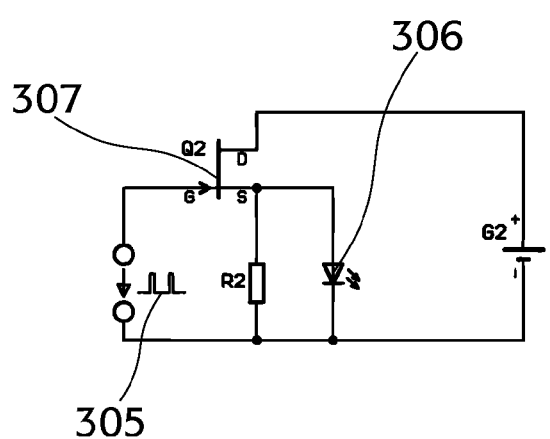

FIG. 3 is a schematic of the two variants of an electrical circuit for actuating the electro-optical gates, which preferably are integrated into a semiconductor component.

Variant 300 shows an active component 304, preferably a transistor Q1, that is fed an electrical modulation signal 302 and amplifies this signal 302 to operate an electro-optical gate 303, preferably a RW modulator. G1 is the power supply of the circuit.

The modulation signal 302 may basically take any shape, however it is preferred that it has a hysteresis, sine, or pulse-shaped voltage-time curve.

Variant 301 shows an active component 307, preferably a transistor Q2, that is fed an electrical modulation signal 305 and amplifies this signal 305 to operate an electro-optical gate 306, preferably a RW modulator. G2 is the power supply of the circuit.

In conjunction with the top pulse regime of FIG. 2, it is preferred that circuit 300 is used for actuating the second modulator 102 with envelope 204 while circuit 301 is preferably used to actuate the first modulator 101 with envelope 202.

Figure 4:
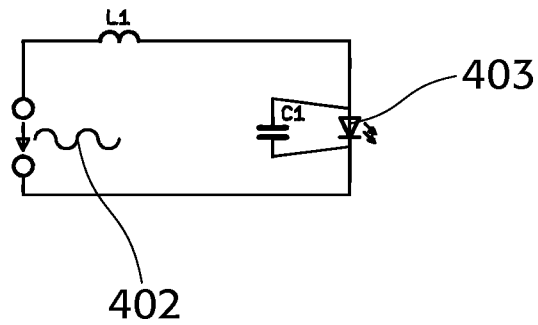
FIG. 4 shows a diagrammatic view of a second preferred embodiment of the actuation circuits for the modulators.
Figure 4:
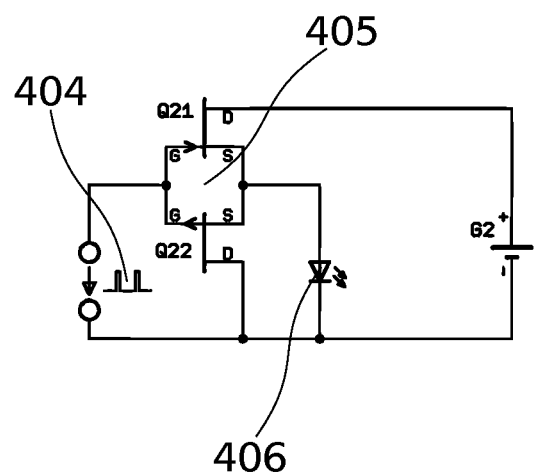

In FIG. 4, circuit diagram 400 shows an arrangement in which the modulator is included in a resonance circuit with an electrical control signal 402, which due to its design encounters a parasitic inductance L1 and a parasitic capacitance C1 that are inherent in the electro-optical gate 403, preferably a RW modulator. The advantage of this arrangement is that the rate-reducing effect of the parasitic elements is avoided through resonance operation. Circuit diagram 401 shows a pulse-shaped control signal 404 that controls an active component 405 of two transistors Q21, Q22 to operate an electro-optical gate 406, preferably a RW modulator. G2 is the power supply of the circuit. Circuit diagram 401 outlines a push-pull configuration of two transistors, wherein the symmetrical power supply is not shown but conceivable. It is likewise conceivable that a bootstrap capacitor is integrated between the source S and gate G to better compensate the parasitic capacity of the transistor.

Figure 5:
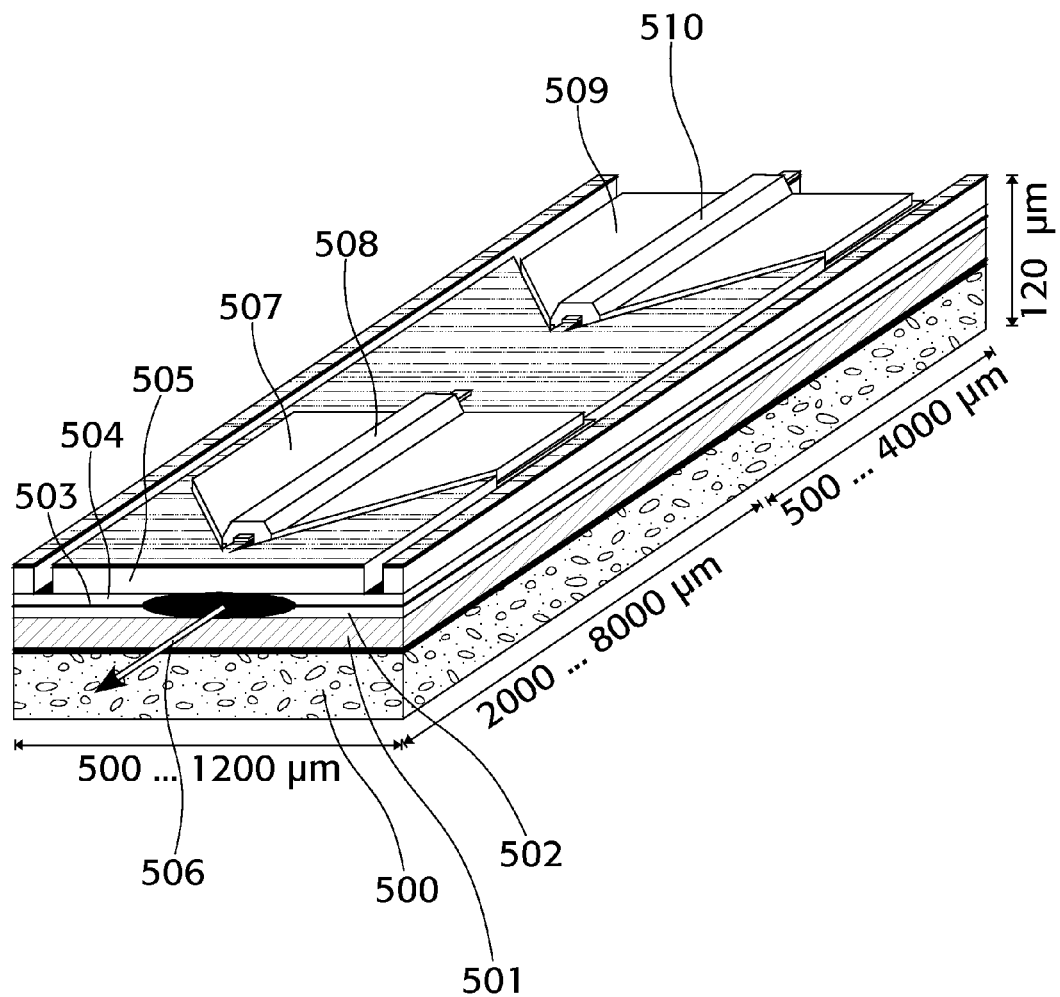
FIG. 5 shows a diagrammatic perspective view of a preferred embodiment of the device according to the invention.

FIG. 5 shows a diagrammatic perspective view of a preferred embodiment of the device according to the invention. In particular, FIG. 5 discloses a substrate 500 with horizontally deposited functional elements such as the bottom cladding layer 501, the bottom part of the waveguide 502, the active layer 503 in which the light propagates in the propagation direction 506, the top part of the waveguide 504, the top cladding layer 505. A first modulator 507 and a second modulator 509 are arranged at a spacing from one another along a light propagation channel 506. The modulator 507 comprises a first ridge waveguide 508 and the modulator 509 comprises a second ridge waveguide 510. Each modulator 507, 509 includes electrically conductive material and is connected to a control circuit (not shown here; see FIGS. 3 and 4).

According to the invention, the first electro-optical modulator 507 and the second electro-optical modulator 508 are actuated at offset times, such that the passage time (i.e. both modulators are transparent) of the device according to the invention can be reduced considerably.

What is claimed is:
1. A method for selecting optical pulses with improved edge steepness using a device for selecting pulses, the device comprising:
   an optical waveguide for guiding an optical radiation along an axis;
   a first electro-optical modulator that is designed to modulate the optical transparency of the waveguide; and a second electro-optical modulator that is designed to modulate the optical transparency of the waveguide; and wherein, the first modulator and the second modulator are arranged one after the other on the axis of the waveguide; and furthermore at least one control circuit is provided that is designed to drive the first modulator and the second modulator at offset times, wherein, a substrate consisting of a semiconductive material is provided, and that the waveguide and the at least one control circuit are arranged onto the substrate, wherein the method comprising the following process steps:

input of a pulse sequence into the optical waveguide;

controllable absorption of portions of the pulse sequence in the first electro-optical modulator; and controllable absorption of portions of the pulse sequence in the second electro-optical modulator, wherein, the first modulator is switched to transparency, while the second modulator is switched from absorption to transparency;

the second modulator is switched to transparency, while the first modulator is switched from transparency to absorption;

an edge with which the first modulator switches from transparency to absorption is steeper than an edge with which the second modulator switches from transparency to absorption; and an edge with which the second modulator switches from absorption to transparency is steeper than an edge with which the first modulator switches from absorption to transparency.

2. The method according to claim 1, wherein, a periodic pulse sequence is fed into the optical waveguide and the period duration of the pulse sequence is greater than the time interval between:

a point in time at which the second modulator is switched from absorption to transparency; and a point in time at which the first modulator is switched from transparency to absorption.

3. The method according to claim 1, wherein, the period duration of the pulse sequence is smaller than the time interval between:

a point in time at which the first modulator is switched from absorption to transparency; and a point in time at which the second modulator is switched from transparency to absorption.

* * * * *